United States Patent
Negahdaripour et al.

(10) Patent No.: US 7,496,226 B2
(45) Date of Patent: Feb. 24, 2009

(54) MULTI-CAMERA INSPECTION OF UNDERWATER STRUCTURES

(75) Inventors: Shahriar Negahdaripour, Coral Gables, FL (US); Pezhman Firoozfam, Richmond (CA)

(73) Assignee: University of Miami, Miami, FL (US)

( * ) Notice: Subject to any disclaimer, the term of this patent is extended or adjusted under 35 U.S.C. 154(b) by 792 days.

(21) Appl. No.: 10/941,451

(22) Filed: Sep. 15, 2004

(65) Prior Publication Data

US 2006/0008137 A1   Jan. 12, 2006

Related U.S. Application Data

(60) Provisional application No. 60/504,330, filed on Sep. 19, 2003.

(51) Int. Cl.
*G06K 9/00* (2006.01)
(52) U.S. Cl. .................. 382/154; 382/100; 114/312; 348/81
(58) Field of Classification Search .............. 382/154, 382/100; 114/313, 222, 337, 312; 701/1, 701/2, 23, 116; 348/75, 66, 81; 166/355; 405/188, 191; 600/109, 110, 182, 130, 163; 367/131, 910; 324/229; 433/29
See application file for complete search history.

(56) References Cited

U.S. PATENT DOCUMENTS

| | | | | |
|---|---|---|---|---|
| 3,781,775 A | * | 12/1973 | Malloy et al. | 367/104 |
| 5,412,569 A | * | 5/1995 | Corby et al. | 701/2 |
| 5,507,596 A | * | 4/1996 | Bostelman et al. | 405/191 |
| 5,706,195 A | * | 1/1998 | Corby et al. | 701/2 |
| 5,947,051 A | * | 9/1999 | Geiger | 114/313 |
| 6,333,826 B1 | * | 12/2001 | Charles | 359/725 |
| 6,348,942 B1 | * | 2/2002 | Watkins | 348/81 |

OTHER PUBLICATIONS

R. Volden; Modelbased and Operator Assisted Computer Vision in ROV Teleoperation; Norge~Tekniske Hoegskole, Trondhein; Report No. NEI-NO-627, ISBN 82-7119-762-2; Aug. 27, 2003; An abstract of this article may be found at https://mem be rs.knowledge , express.com/recordview, asp'? ri d=236071 &b i d=20& L i st l. oc=4 & Sc.*

(Continued)

*Primary Examiner*—Sheela C Chawan
(74) *Attorney, Agent, or Firm*—Christopher & Weisberg, P.A.

(57) ABSTRACT

A method, system and apparatus for viewing and imaging an underwater structure from a submersible platform, navigating along the structure and constructing a map of the structure in the forms of a photo-mosaic and a 3-D structural map. The system can include a submersible platform, at least two cameras coupled to the submersible platform, and stereovision matching logic programmed to simulate a frontal view of a target underwater structure from a fixed distance based upon an oblique view of the target underwater structure obtained by the cameras from a variable distance. The cameras can be forward or side mounted to the submersible platform and can include optical cameras, acoustical cameras or both. Preferably, the submersible platform can be a remotely operated vehicle (ROV), or an autonomous underwater vehicle (AUV). Finally, the system further can include absolute positioning sensors.

17 Claims, 3 Drawing Sheets

OTHER PUBLICATIONS

An Underwater Remotely Operated Vehicle to Test Enhanced Human Interfaces; Accession No. 17103, Start Date 1991, Knowledge Express. An abstract of this article may be found at https://members.knowledgeexpress.com/recordview.asp?rid-8812936&dbid=2&ListLoc=2&So.

R. Volden; Modelbased and Operator Assisted Computer Vision in ROV Teleoperation; Norges Tekniske Hoegskole, Trondhein; Report No. NEI-NO-627, ISBN 82-7119-762-2; Aug. 27, 2003; An abstract of this article may be found at https://members.knowledgeexpress.com/recordview.asp?rid=236071&dbid=20&ListLoc=4&Sc.

Development of a Submarine Inspection Remotely Operated Vehicle;Benthos, Inc.; Accession No. 18251; 1992; An abstract of this article may be found at https://members.knowledgeexpress.com/recordview.asp?rid=8814033&dbid=2&ListLoc=0&Sc.

US Coast Guard Purchases Fourth VideoRay with Desert Ray Navigation; VideoRay LLC; Aug. 28, 2003; An abstract of this article may be found at http://www.videoray.com/Press_Room/coast_guard_print.htm.

VideoRay Products; Sep. 10, 2003; An abstract may be found at http://www.videoray.com/Products/products.htm.

* cited by examiner

MULTI-CAMERA INSPECTION OF UNDERWATER STRUCTURES

CROSS-REFERENCE TO RELATED APPLICATIONS

This patent application claims the benefit under 35 U.S.C. § 119(e) of presently U.S. Provisional Patent Application 60/504,330, entitled ROV-BASED SHIP HULL INSPECTION, filed on Sep. 19, 2003, the entire teachings of which are incorporated herein by reference.

STATEMENT REGARDING FEDERALLY SPONSORED RESEARCH

The government of the United States of America has rights in this invention pursuant to grant number N000140310074-02 by the United States Department of Defense Office of Naval Research to the University of Miami.

FIELD OF THE INVENTION

The present invention relates to the visual inspection of an underwater structure such as a ship hull, and more particularly to a vision system for use in the automated and human-assisted inspection of underwater structures.

BACKGROUND OF THE INVENTION

In-water inspection is an essential task in the general maintenance and damage assessment of underwater structures. For example, the inspection of a ship hull always has formed the principal component of a periodic maintenance routine. More recently, ship hull inspections have become extremely important in respect to homeland security in view of the threat that ships entering ports and harbors for commerce may serve as carriers of nuclear weapons, explosives, deadly chemicals and other hazardous materials. To combat the foregoing clear threat, the deployment of existing, and development of new, remote detection technologies have become a national priority.

Like a periodic maintenance routine, the inspection of ship hulls, bridge pilings, dams and off-shore oil structures or pipelines can use the participation by skilled divers. Yet, the process of underwater search and inspection in the context of security and risk containment has proven too dangerous for direct human involvement. In particular, the potential presence of hazardous and deadly materials has proven human involvement to be unsafe and requires the use of submersible robotics platforms to avoid risking human lives. As a result, in general it is expected that the deployment of unmanned underwater vehicles, when highly automated, will provide a more effective and efficient solution to the problem of underwater inspection.

Current generation submersible platforms, such as autonomous underwater vehicles (AUVs) and remotely operated vehicles (ROVs), enjoy distinct operational advantages over the use of other submersible platforms. Exemplary operational advantages include real-time video and data transmission to the operator station which can enable the operator to revise the mission "on the fly" or take assume manual operation of the vehicle when necessary. Additional advantages include maneuverability and a division of labor by automating many low-level tasks as in precise navigation and the construction of a composite map of the target structure, while the operator can concentrate on high-level critical components as in target and object recognition, threat assessment, and the like.

In recent years, each of automated video-based surveillance, surveying and mapping have become recognized as the principal important capabilities of the AUV and ROV, particularly in respect to ocean exploration, and seafloor and benthic studies. The goal is to process the video imagery online, as acquired, to determine the position of the AUV or ROV relative to the target of interest, and to automatically navigate under computer control to inspect and map the various parts of the target structure. While the absence of natural lighting at depth can pose serious challenges in deep sea operations, other serious complexities in the computer processing and analysis of the video can arise in shallow waters in the course of performing automated inspection. Such complexities can include those which arise due to non-uniform moving shadows cast by surface waves, floating suspended particles, and the like.

Video-based servo and mapping represent two popular applications of vision techniques applied underwater. The fundamental problem is to estimate the frame-to-frame motions of the camera from the corresponding pair of images. Moving shadows represent one of the major complexities in the processing of underwater video. In deep sea, these are induced by the motion of artificial sources with limited power. For shallow water inspection, one is primary concerned with disturbances near the sea surface.

In shallow waters, disturbances arise from the surface waves that cast shadows on the structure to be imaged. In some cases, for instance where the target surfaces have weak texture, these shadow artifacts can dominate the image variations induced by camera movements which comprise the primary visual cues for determining the motion information. In addition, other complexities arise from the movement of floating suspended particles and water bubbles that are commonly present in shallow waters.

Estimation of the various degrees of freedom in the motion of the vehicle can be important for both position control and target mapping. As stated, the instantaneous pose including position and orientation of the submersible platform relative to the target is sought, rather than its absolute three-dimensional position, as the most relevant information. Most small-size ROVs include four thrusters—two aft, one lateral and one vertical. The thrusters can be applied for X-Y-Z translations and heading change. A video camera can be installed at the front of the ROV and can be aimed anywhere including the forward and downward directions.

The ideal mode for visual servo, when a submersible vehicle navigates along the sea floor, is the down-look configuration. FIGS. 1A through 1C, taken together, are a pictorial illustration of an ROV 110 configured with a single optical camera 120. Referring first to FIG. 1A, the camera 120 can be positioned in a down-look orientation for sea-floor mapping. The down-look configuration can be preferred because four of the six degrees of freedom in the motion of the vehicle 110, controllable through the proper signals to the four thrusters of most common ROVs, are the same four degrees of freedom that can be estimated most reliably from the video frames of the sea floor.

Notably, the skilled artisan will recognize that one can claim that the controllable system states are all observable. Yet it will also be recognized that the same may not be assumed about uncontrollable states, namely pitch and roll motions. While the pitch and roll states theoretically can be determined from video, the estimation is seldom robust and accurate particularly where the target scene (seafloor) is relatively flat. That is, where the topographical variations are small compared to the distance to the sea floor, it can be difficult to estimate the pitch and roll states of the visual servo. Accordingly, the most ideal scenario to maintain positioning accuracy by visual servo is to navigate with no, or very little, pitch and roll motion.

To observe and estimate these other motion components, inexpensive angle sensors are often sufficient. In this case, the video is rectified to correct for (stabilized with respect to) pitch and roll motions, before processing to estimate the other four degrees of freedom, providing all the necessary information for positioning and producing a mosaic. By comparison to seafloor mapping, for hull inspection, the ROV 110 can traverse the vertical sides of the ship, maintaining a constant distance and orientation relative to the ship. In one scenario, illustrated in FIG. 1B, an extra camera 130 is installed in a side-look arrangement while the vehicle 110 moves forward or backward along the hull. Alternatively, as shown in FIG. 1C, the existing camera 120 may be pointed in forward-look configuration, while the vehicle 110 moves sideways (left and right) to map the ship. In either configuration, the change in the heading of the ROV 110 corresponds to the pan motion of the camera 120, which often cannot be estimated with good accuracy from video when coupled with side-to-side translation. Unfortunately, the heading change cannot be reliably measured from typically compasses due to magnetic masking near the ship.

SUMMARY OF THE INVENTION

The present invention addresses the deficiencies of the art in respect to in-water structure inspection and provides a novel and non-obvious method, system and apparatus for the visual inspection of an underwater structure. In accordance with the inventive arrangements, a stereovision camera system can be provided for visually inspecting and mapping underwater structures. The stereovision system can include programmatic logic for performing image data acquisition, image data processing and analysis, and image display including the display of both the raw images and processed data. In the most general setting, any two-dimensional or three-dimensional optical or acoustic imaging system can be deployed as the data acquisition component. Examples can include standard CCD video cameras, as well as DIDSON (dual frequency identification sonar) acoustic cameras.

In a preferred aspect of the present invention, two or more digital or analog, optical or acoustic cameras can be used for stereo imaging, enabling the extraction from images of positioning information with respect to the target structure for automated navigation and mapping. In this regard, preferably two optical cameras can be used. Digitized video either from digital cameras or from analog cameras that are digitized with frame grabbers/digitizers can be displayed at a specified frame rate on a monitor at a remote station for human observation, in addition to being processed by a computer to extract information for automatic navigation and target mapping. It will be recognized by the skilled artisan that most objects are so large in size as to require the imaging thereof in a large number of images of smaller sections. Accordingly, the construction of a composite image can require the alignment of many images acquired from various viewing positions and angles.

In order to build a composite object map or image, the position and pose of the cameras at each viewing point will be required. In the most general realization of the present invention, the position and pose information can be obtained from a number of underwater positioning sensors. Alternatively, the position and pose information can be derived directly from stereo images. More specifically, to achieve the determination of the position and pose of the cameras, the stereo images can be processed by a vision system to determine the distance and pose of the vision system relative to the object being inspected. Furthermore, consecutive images from different positions can be processed to compute the movement of the cameras as the cameras view the various portions of the object under inspection.

Information regarding the position and motion of the vision system then can be used to produce from the images acquired at different camera positions and poses a composite image and model of the target object in real time. The composite view, referred as a photo-mosaic, can be two-dimensional, however, a three-dimensional mosaic/map also can be constructed from the stereo disparity information. In a preferred aspect of the present invention, the positioning information computed from stereo imagery is relative to the target, and is sufficient for target inspection and mapping applications. In a more general configuration, where a geo-referenced three-dimensional object model must be constructed, other absolute positioning sensors, for example angle sensors, gyroscopes, INS, long/short-baseline acoustic systems, and the like can be integrated as is commonly done in other imaging and mapping applications such as in side-scan sonar imaging and laser line scan systems.

Finally, the system can be deployed in one of many forms including a diver handheld stereo imaging system, or a stereovision system deployed in an automated submersible platform, such as an ROV or AUV. In the second scenario where underwater platforms are deployed, the positioning information acquired from the stereo imaging system and other sensors can be used to navigate the platform automatically, instead of by a human operator through a joystick or other forms of navigation commanding instruments. Consequently, the most automated realization of the system can be provided both for navigation and mapping, in addition to inspection of the underwater structure.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

I. Introduction

Figure 1A:
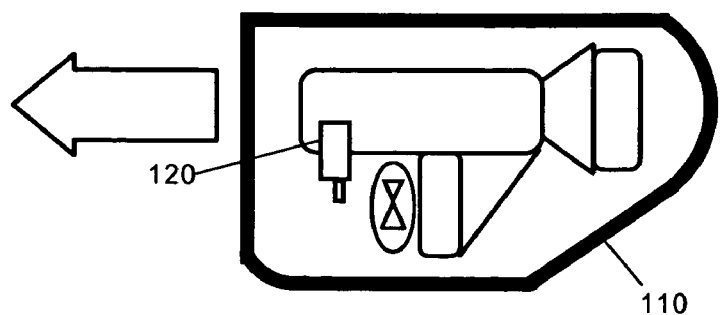
FIGS. 1A through 1C, taken together, are a pictorial illustration of an ROV known in the art and configured with a single camera mono-vision structure and seafloor inspection.
Figure 1B:
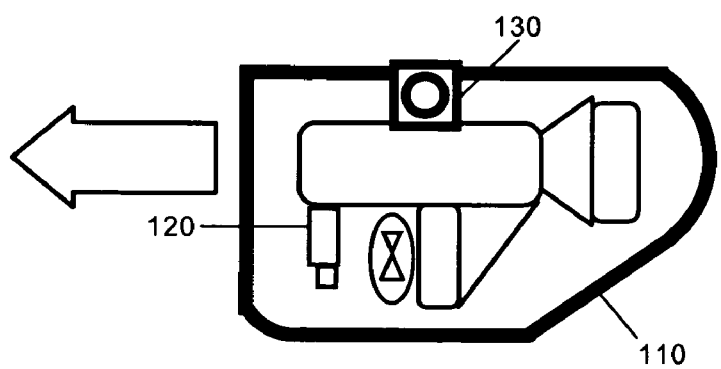
Figure 1C:
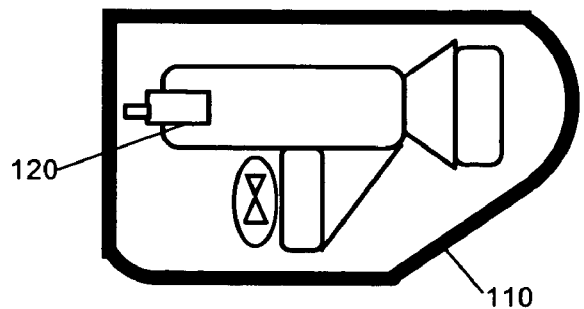

The present invention is a multi-camera vision system for automated or operator-assisted inspection of underwater structures. The system of the present invention can include a stereovision system for precise positioning and navigation. The stereovision system can perform precise positioning and navigation by estimating the six degrees of freedom in the movement of a submersible platform directly from acquired images. In this regard, the stereo imagery can provide direct measurements of the distance and orientation with respect to the structure, which subsequently can be used to control the trajectory of the platform. The stereo processing performance can be optimized to take advantage of the relatively flat shape of target surfaces at arbitrary orientations, including hull surfaces, dams and docks. The information regarding the motion of the platform, determined from consecutive stereo imagery, also can be used for image or target three-dimensional (3-D) map alignment to construct a mosaic in real time. Displayed on an operator screen, the mosaic can provide a composite image or 3-D map of the underwater structure for inspection purposes.

II. Automated Submersible Platform Based Operation

To inspect an underwater structure such as a ship hull, a submersible platform such as an ROV can maintain a desired pose and position at all times. While positioning sensors can be used in carrying out the task automatically, a favorable approach is to seek pose and distance estimates relative to the ship, rather than absolute measurements which may be harder to determine or more costly with expensive sensors. In a common scenario, the submersible platform can navigate along the structure, keeping a frontal view and a fixed safe distance $D_s$ relative to the structure. As the structure wall may bend at places, the submersible platform can turn with the structure to maintain the desired pose. In the present invention, a multi-camera vision-based solution is provided with the sought after capabilities for automatic navigation, while simultaneously producing a composite photo-mosaic of the underwater structure in real time.

III. Stereovision-Based Servo and Mapping

A stereovision system can overcome various complexities of vision-based mapping and positioning based on a single camera. Consequently, the difficulties of vision based mapping in shallow water can be overcome. Moreover, a system can be provided which can estimate with a high degree of accuracy the six degrees of freedom with respect to positioning information relative to a target underwater structure solely from images. Complexities from cast shadows are of little concern, and in fact are exploited by improving the positioning accuracy.

Specifically, as consecutive stereo pairs are recorded as the submersible platform translates parallel to a structure surface underwater, moving shadow artifacts are imaged in the stereo pair at the same time instant. As a result, the stereo correspondence problem of stereovision for matching features can be solved by exploiting both the surface markings and the shadow artifacts. As it is known to the skilled artisan, the solution to the stereo correspondence problem can produce disparity information between corresponding elements in two stereo images, for instance corresponding points or corresponding regions, from which a three-dimensional structural information can be derived. In particular, the extreme impossible case for feature matching, where the surface has no markings, can now be addressed by simply utilizing the cast shadow patterns.

Submersible platform positioning, by determining either or both of the pose and the frame-to-frame movements of the submersible platform, can be simplified by decomposing the determination problem into two simpler problems that are solved consecutively: 1) three degrees of freedom by stereo matching applied to the left and right stereo pairs $I^l(k)$ and $I^r(k)$ at time k; 2) three other degrees of freedom by frame-to-frame registration. The 3-D vector $\{\Omega_x(k), \Omega_y(k), \Omega_z(k)\}$ are the angles that describe the orientation of the submersible platform at time k relative to the target surface. Similarly, X(k) and Y(k) denote the estimated horizontal and vertical positions with respect to some reference point, e.g., the starting point, and Z(k) is the instantaneous distance along the optical axis from the target surface. The three-dimensional vectors $\{\omega_x(k), \omega_y(k), \omega_z(k)\}$ and $\{t_x, t_y, t_z\}$ denote the estimated frame-to-frame rotational and translational motions.

Without loss of generality, it can be assumed that a frontal view is to be maintained (heading angle $\Omega_y(k)=0$ for all k) with a fixed safe perpendicular distance $Z(k)=D_s$ relative to the underwater structure. Two other orientation angles, pitch $\Omega_x(k)$ and roll $\Omega_z(k)$ are to also remain at zero, but may not be controllable in a traditional ROV with only four thrusters. At each instant three of the components of the submersible platform's pose and position can be determined from stereo cues, by processing $I^l(k)$ and $I^r(k)$. What will remain are three image plane motion components—XY translation and vehicle roll (rotation about the optical axes of the cameras)—to compute from visual motion cues. In further explanation, at each instant k, the relative heading $\Omega_y(k)$ and pitch $\Omega_x(k)$ angles can be estimated as can the distance Z(k) from the structure by stereo matching. Using the measured angles and distance, the stereo images can be rectified: Specifically, rectified left $\tilde{I}^l(k)$ or right $\tilde{I}^r(k)$ video can be constructed that can provide frontal views of the hull at the desired constant distance $D_s$.

Figure 2:
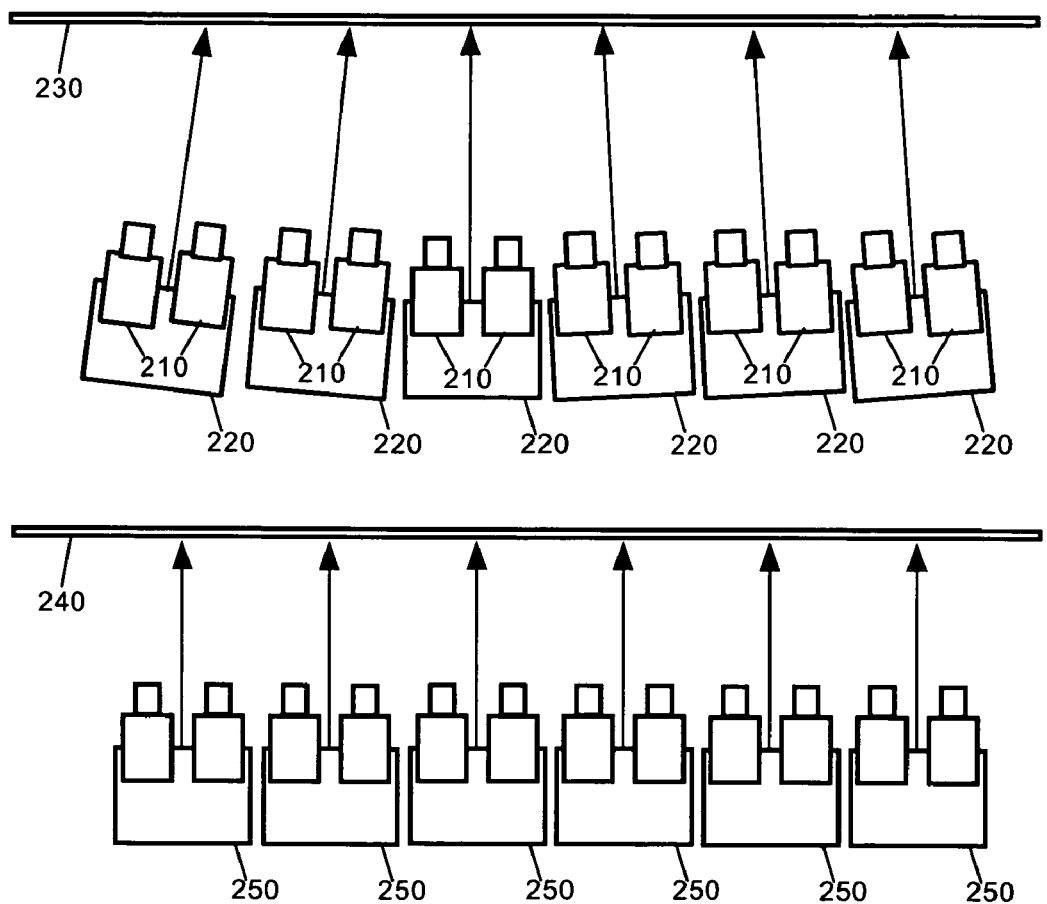
FIG. 2 is a pictorial illustration of a submersible platform configured with a stereovision system and postured at relative distances to the target as computed from binocular cues in stereo imagery, which such distance is used to generate a rectified video; simulating frontal views at fixed distance from the target; and, FIG. 3 is a flow chart illustrating a process for generating a rectified video simulating frontal views of a target object and constructing a photo-mosaic and three-dimensional map of the target object.

In more specific illustration, the top portion of FIG. 2 depicts a submersible platform 220 having two cameras 210 affixed thereto as the submersible platform 220 moves laterally along the target surface 230 of an underwater structure, such as a ship hull. The relative vehicle pose and the distance to the target surface 230 can be computed using binocular cues produced by images acquired through the cameras 210. Using the binocular cues, a rectified video can be generated in order to simulate frontal views at a fixed distance from the target surface 230.

The bottom portion of FIG. 2 is an image depicting the target surface 240 of the same underwater structure viewed obliquely, and the rectified image corresponding to a frontal view based upon estimated camera poses 250. Combining the top and bottom portions, FIG. 2 as a whole demonstrates the construction of the frontal view from an oblique view. The displacements $t_x$ and $t_y$ and roll motion $\omega_z$ are readily estimated from the rectified video, say $\tilde{I}^l(k-1)$ and $\tilde{I}^l(k)$, at each vehicle position. Integrating the displacements completes the measurements of the ROV position, also enabling the construction of the photo mosaic from the video, say the left sequence $\tilde{I}^l$, or 3-D target map from the stereo disparity map. Simultaneously, thruster control signals are generated based on the discrepancies from the desired heading and pitch angles, and the distance to the hull at each time k, and to move laterally along the target structure.

Figure 3:
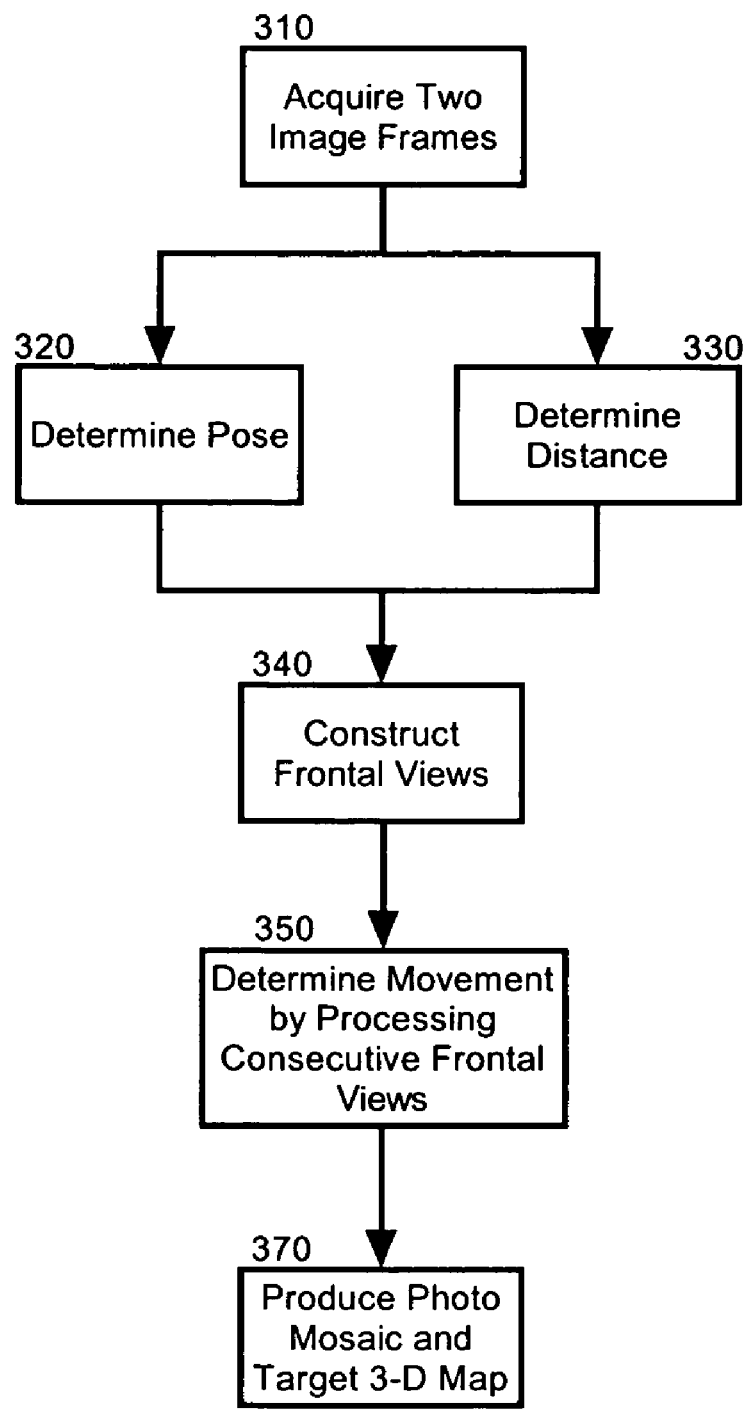

Referring now to FIG. 3, a flow chart is shown which illustrates a process for generating a rectified video simulating frontal views of a target object. In block 310, first two image frames of an object under inspection can be concurrently acquired through the operation of two cameras. Subsequently, in block 320, the pose of the platform supporting the cameras can be determined relative to the object under inspection through the locations of a number of visual feature in the two image frames. Similarly, in block 330, the distance of the cameras to the object under inspection can be determined through the locations of the visual features in the two image frames. In block 340, rectified frames are constructed that produce the frontal views of the target object under inspection. Consequently, in block 350 the movement of the cameras can be determined based upon the movement of the visual features across the consecutively acquired frames and by processing consecutive frontal views. Finally, in block 360, using the pose, distance and movement information, a composite photo-mosaic and 3-D map of the object under inspection can be produced.

IV. Summary

Inspections of ship hulls, bridges, port docks, dams and similar structures are suitable applications of ROVs. The effectiveness of the operation is directly tied to capabilities that can be carried out automatically, including navigation and mapping, and potentially under human supervision. The present invention addresses the application of visual inspection, navigation and mapping. While some of the challenges in utilizing a monocular system may be hard to overcome, the present invention demonstrates the significant benefits of stereo vision for the realization of a robust system. In particular, the inherent complexities of a monocular system are readily resolved by stereo vision.

The method of the present invention can be realized in hardware, software, or a combination of hardware and software. An implementation of the method of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for viewing an underwater structure comprising the steps of:
    collecting a set of stereo images of the underwater structure from different positions and poses with respect to the underwater structure;
    identifying stereo cues in said stereo images;
    utilizing said stereo cues to match and process stereo pairs in said stereo images; and,
    rectifying said matched pairs to produce a simulated frontal view of the underwater structure.

2. The method of claim 1, wherein said identifying step comprises the step of identifying the correspondences of matching elements in said stereo images.

3. The method of claim 1, wherein said utilizing step comprises the steps of determining pose, distance, frame-to-frame movement, and a stereo disparity map.

4. The method of claim 3, wherein said determining step comprises the steps of:
    first determining said pose by computing three degrees of freedom by stereo matching applied to left and right ones of stereo pairs at a specified time;
    second determining said frame-to-frame movement by computing three other degrees of freedom by frame-to-frame registration at consecutive views; and,
    third determining a three dimensional shape of the underwater structure from stereo cues by stereo matching to determine disparities between corresponding points in said stereo pairs.

5. The method of claim 1, further comprising the step of generating a composite photo-mosaic and a 3-D view of the underwater structure based upon computed camera positions and one of consecutively acquired stereo images and rectified frontal views.

6. A system for viewing an underwater structure from a submersible platform comprising:
    a submersible platform;
    at least two cameras coupled to said submersible platform; and,
    stereovision matching logic programmed to simulate a frontal view of a target underwater structure from a fixed distance based upon an oblique view of said target underwater structure obtained by said cameras from a variable distance.

7. The system of claim 6, wherein said cameras are mounted to said submersible platform at a position selected from the group consisting of both forward mounted and both side mounted.

8. The system of claim 6, wherein said cameras are optical cameras.

9. The system of claim 6, wherein said cameras are acoustical cameras.

10. The system of claim 6, wherein said submersible platform is a remotely operated vehicle (ROV).

11. The system of claim 6, wherein said submersible platform is an autonomous underwater vehicle (AUV).

12. The system of claim 6, further comprising absolute positioning sensors.

13. A machine readable storage having stored thereon a computer program for viewing an underwater structure, the computer program comprising a routine set of instructions which when executed by a machine cause the machine to perform the steps of:
    collecting a set of stereo images of the underwater structure from different positions and poses with respect to the underwater structure;
    identifying stereo cues in said stereo images;
    utilizing said stereo cues to match stereo pairs of said stereo images; and,
    rectifying said matched pairs to produce a simulated frontal view of the underwater structure.

14. The machine readable storage of claim 13, wherein said identifying step comprises the step of identifying the correspondences of matching elements in said stereo images.

15. The machine readable storage of claim 13, wherein said utilizing step comprises the step of determining pose, distance, frame-to-frame movement and a stereo disparity map.

16. The machine readable storage of claim 15, wherein said determining step comprises the steps of:

first determining said pose by computing three degrees of freedom by stereo matching applied to left and right ones of stereo pairs at a specified time;

second determining said frame-to-frame movement by computing three other degrees of freedom by frame-to-frame registration of consecutive views; and, third determining a three dimensional shape of the underwater structure from stereo cues by stereo matching to determine disparities between corresponding points in said stereo pairs.

17. The machine readable storage of claim 13, further comprising a routine set of instructions for further causing the machine to perform the step of generating a composite view and a 3-D map of the underwater structure based upon computed camera positions and one of consecutively acquired stereo images and rectified frontal views.

* * * * *